United States Patent
Chan et al.

(10) Patent No.: US 9,699,757 B2
(45) Date of Patent: Jul. 4, 2017

(54) SMALL CELL ASSISTED LOCATION IDENTIFICATION FOR A USER DEVICE

(71) Applicant: Verizon Patent and Licensing Inc., Basking Ridge, NJ (US)

(72) Inventors: Yee Sin Chan, San Jose, CA (US); Jin Yang, Orinda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/253,350

(22) Filed: Apr. 15, 2014

(65) Prior Publication Data

US 2015/0296473 A1    Oct. 15, 2015

(51) Int. Cl.
*H04W 64/00*    (2009.01)
*G01S 5/02*    (2010.01)
*G01S 5/14*    (2006.01)

(52) U.S. Cl.
CPC .............. *H04W 64/00* (2013.01); *G01S 5/02* (2013.01); *G01S 5/14* (2013.01)

(58) Field of Classification Search
CPC ..... H04W 4/02; H04W 84/045; H04W 64/00; H04L 29/08657; G01S 5/0252; G01S 5/14; G01C 21/20; H04M 1/72572
See application file for complete search history.

(56) References Cited

U.S. PATENT DOCUMENTS

| | | | |
|---|---|---|---|
| 7,205,938 B2 * | 4/2007 | Davi | G01S 5/0226 342/451 |
| 8,467,309 B2 | 6/2013 | Chan et al. | |
| 2007/0054670 A1 * | 3/2007 | Kalika | H04L 12/2456 455/446 |
| 2008/0132245 A1 * | 6/2008 | Snow | G01S 19/09 455/456.1 |
| 2014/0274116 A1 * | 9/2014 | Xu | G01S 11/06 455/456.1 |
| 2014/0379255 A1 * | 12/2014 | Johnson | 701/470 |

(Continued)

OTHER PUBLICATIONS

International Telecommunication Union, "Propagation data and prediction methods for planning of short-range outdoor radiocommunication systems and radio local area networks in the frequency range 300 MHz to 100 GHz", Recommendation ITU-R P.1411-6, P Series Radiowave propagation, Feb. 2012, 35 pages.

*Primary Examiner* — George Eng
*Assistant Examiner* — Umair Ahsan

(57) ABSTRACT

A device may initiate a location determination for a user device. The device may receive information identifying a set of base stations for performing the location determination. The device may retrieve, from a data structure and utilizing the information identifying the set of base stations, particular base station information associated with the set of base stations. The particular base station information may include location information for the set of base stations. The device may determine one or more signal strength measurements for one or more signals provided by the set of base stations. The device may determine an approximate location for the user device based on the location information for the set of base stations and the one or more signal strength measurements. The device may provide information associated with the approximate location for the user device.

20 Claims, 9 Drawing Sheets

(56) References Cited

U.S. PATENT DOCUMENTS

| | | | |
|---|---|---|---|
| 2015/0005000 A1* | 1/2015 | Gyorfi | H04W 64/006 455/456.1 |
| 2015/0092584 A1* | 4/2015 | Jung | H04W 52/00 370/252 |
| 2015/0172872 A1* | 6/2015 | Alsehly | G01S 5/0236 455/457 |

* cited by examiner

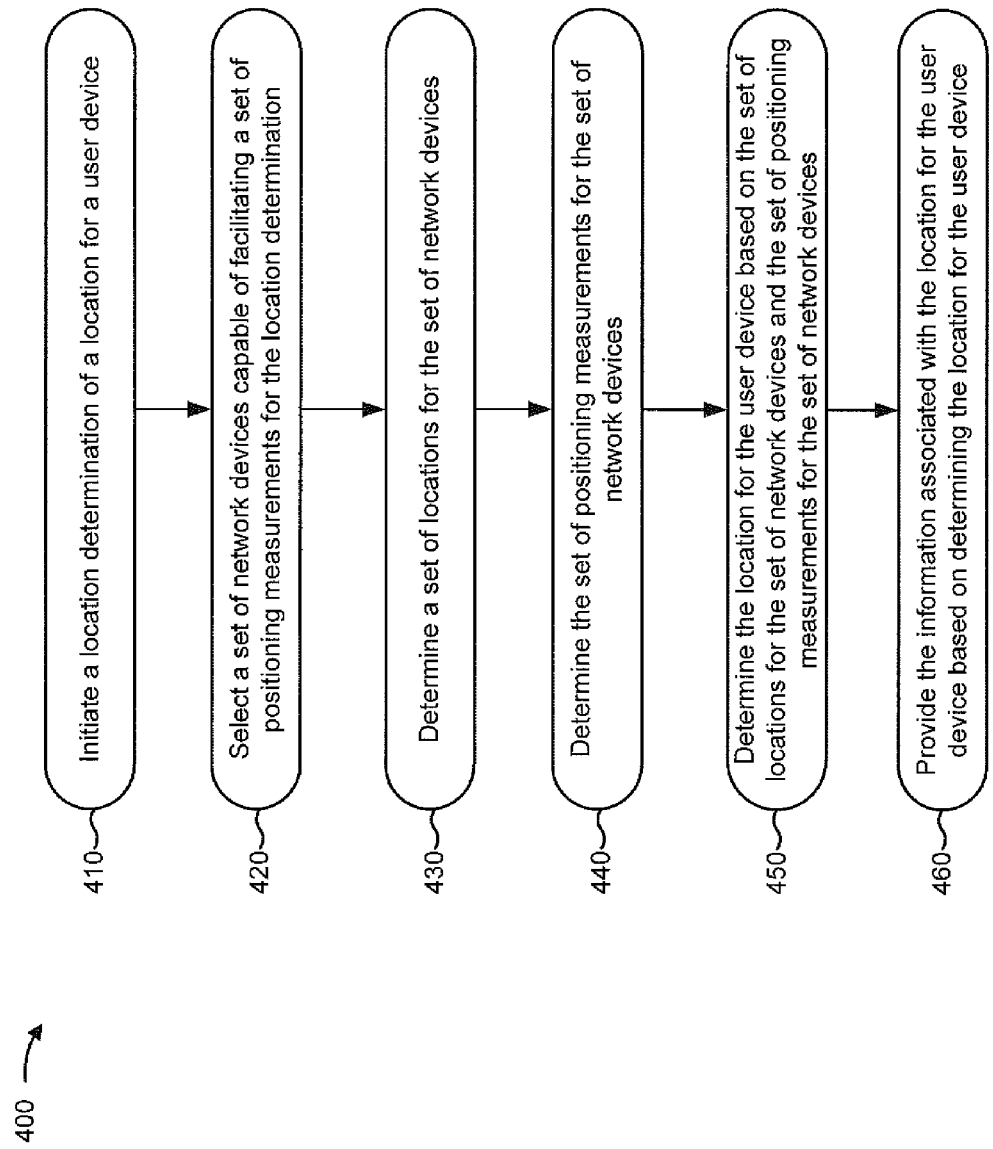

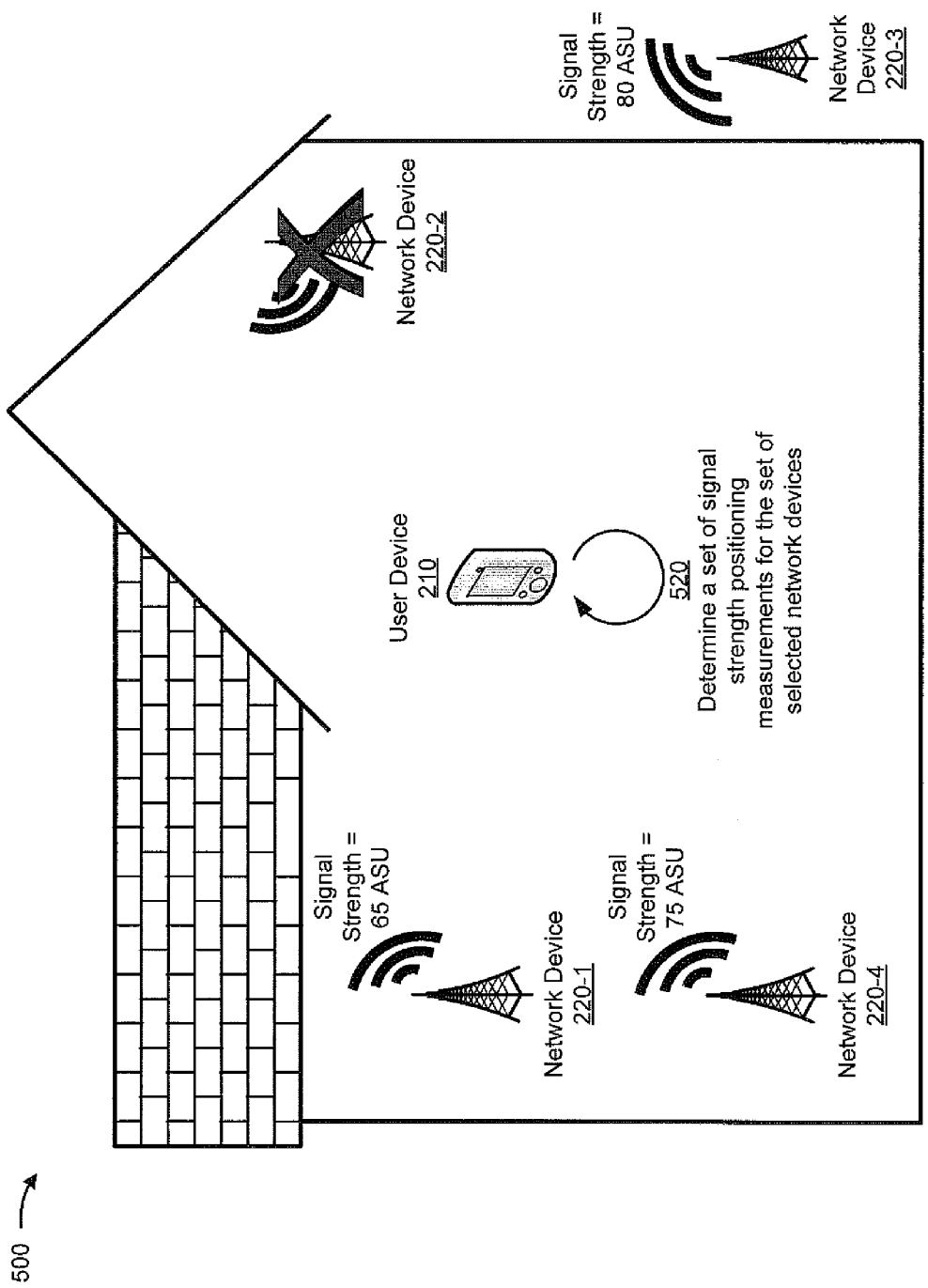

SMALL CELL ASSISTED LOCATION IDENTIFICATION FOR A USER DEVICE

BACKGROUND

A user device may be located in a particular location lacking access to a global positioning system (GPS) signal, such as an urban location, an indoor location, or the like. A small cell base station, such as a femtocell, a picocell, or the like, may be utilized to extend network coverage to the user device in the particular location.

BRIEF DESCRIPTION OF THE DRAWINGS

FIG. 4 is a flow chart of an example process for performing a location determination for a user device without requesting location assistance from a network device; and FIGS. 5A-5D are diagrams of an example implementation relating to the example process shown in FIG. 4.

DETAILED DESCRIPTION OF PREFERRED EMBODIMENTS

The following detailed description of example implementations refers to the accompanying drawings. The same reference numbers in different drawings may identify the same or similar elements.

A user device may be utilized in a particular location, such as an indoor location, an urban location, or the like, for which a small cell base station (e.g., a femtocell, a picocell, etc.) provides a network connection. The user device may utilize location information for location based services, E911 service, or the like. A particular small cell base station may, upon request, provide location assistance via synchronized signals when a GPS signal is unavailable to the user device. However, location assistance from the particular small cell base station may necessitate excessive signaling, and may degrade network performance. Implementations described herein may utilize pre-registered location information for one or more small cell base stations and one or more measured signal strengths associated with the one or more small cell base stations to perform a location determination for the user device without requesting location assistance from the one or more small cell base stations.

Figure 1A:
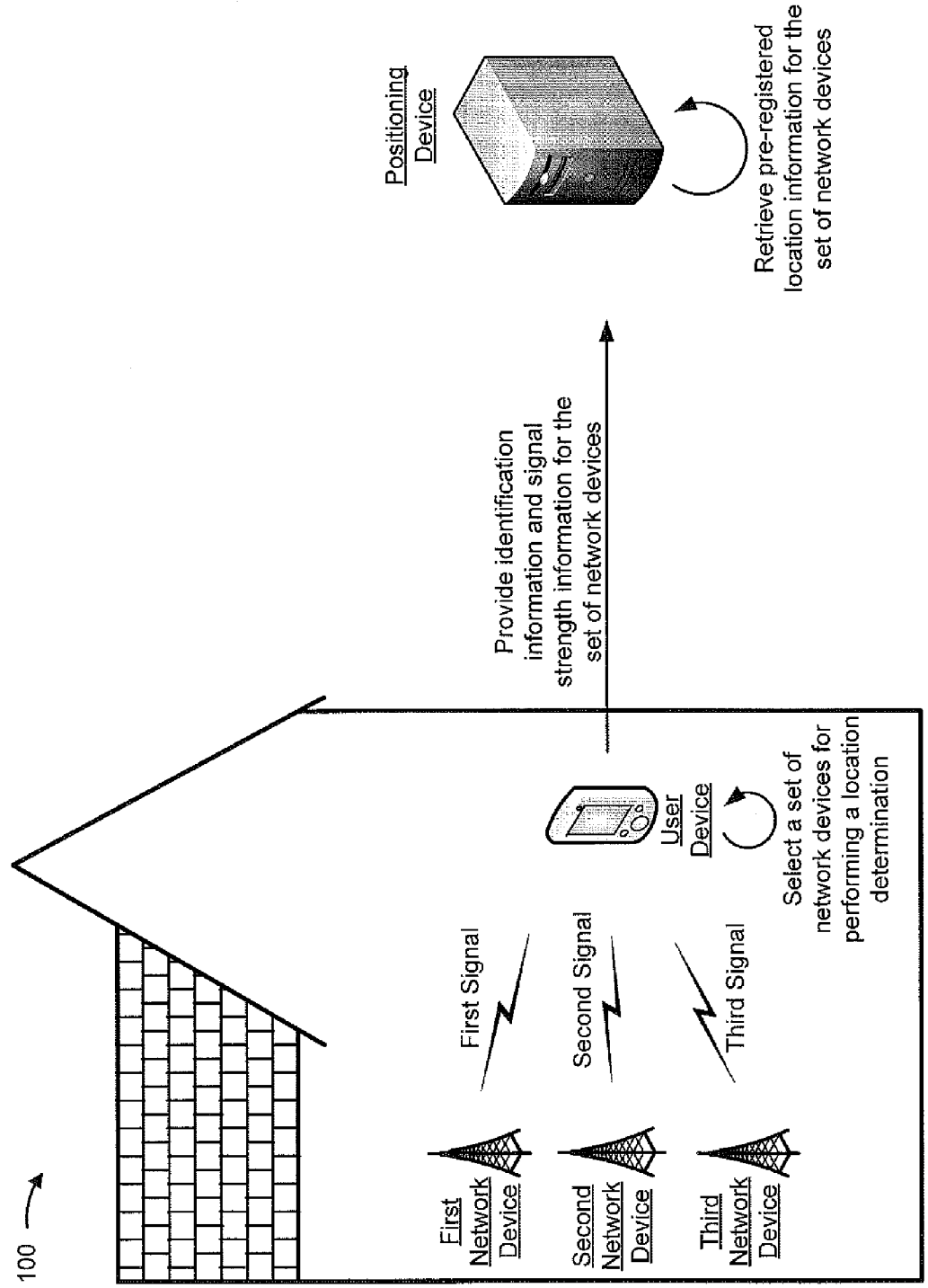
FIGS. 1A and 1B are diagrams of an overview of an example implementation described herein.
Figure 1B:
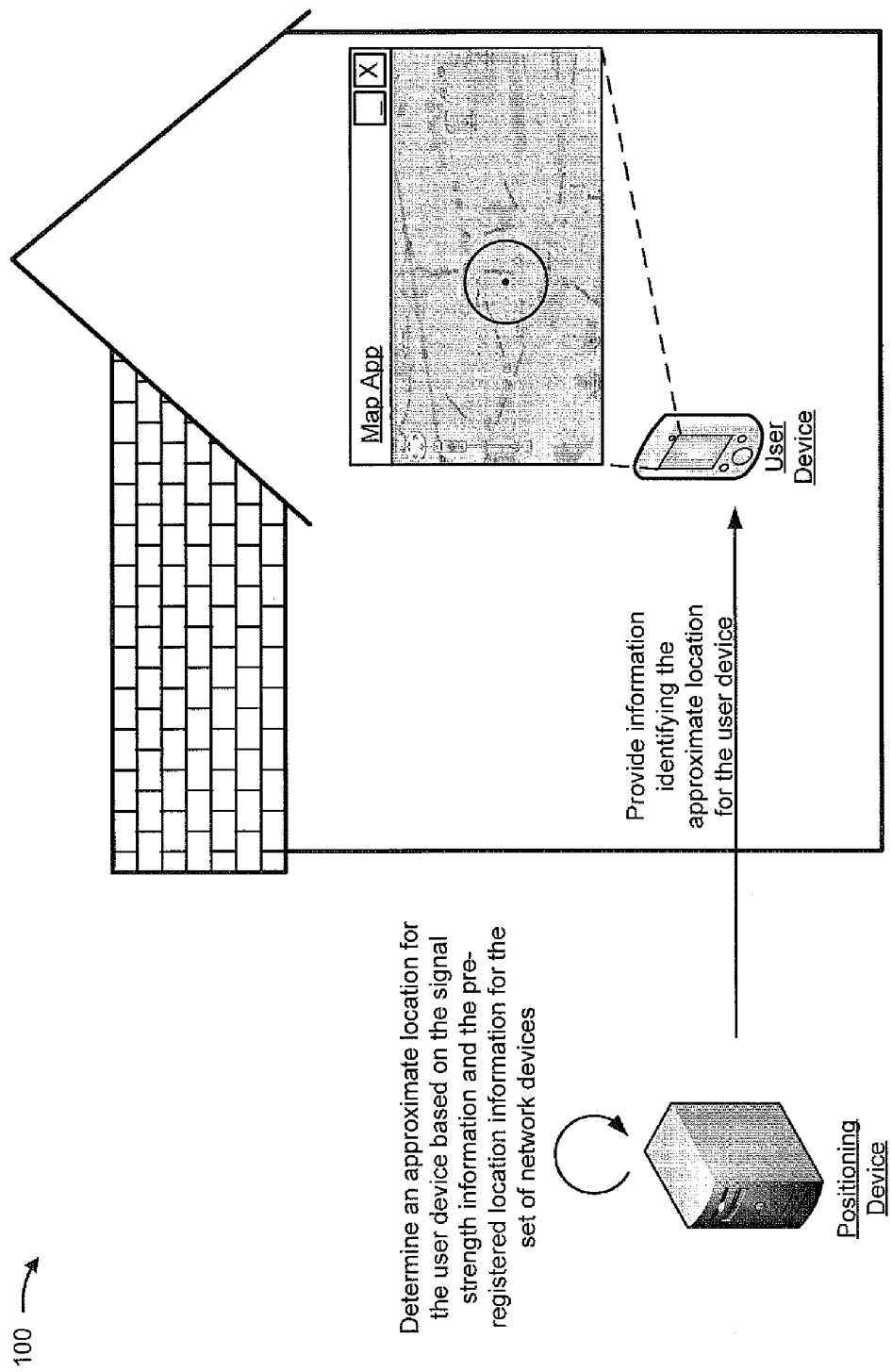

FIGS. 1A and 1B are diagrams of an overview of an example implementation 100 described herein. Example implementation 100 may include a user device, a set of network devices (e.g., a set of small cell base stations etc.), such as a first network device, a second network device, and a third network device, and a positioning device. As shown in FIG. 1A, the user device may select the set of network devices for performing a location determination. For example, the user device may detect a first signal from the first network device, a second signal from the second network device, and a third signal from the third network device, and may select the first network device, the second network device, and the third network device for performing the location determination. The user device may determine a set of positioning measurements, such as a set of signal strength measurements or the like. For example, the user device may determine a first signal strength for the first signal associated with the first network device, a second signal strength for the second signal associated with the second network device, and a third signal strength for the third signal associated with the third network device. The user device may determine an identifier for each particular network device, of the set of network devices, without forming a connection with each particular network device, such as by detecting a base station identity code, a global cell identifier, or the like, being transmitted by each particular network device. For example, the user device may determine a first identifier from the first signal for the first network device, a second identifier from the second signal for the second network device, and a third identifier from the third signal for the third network device.

As further shown in FIG. 1A, the user device may provide, to the positioning device, information identifying the set of network devices (e.g., a set of base station identity codes, a set of cell global identities, etc.) and information identifying the set of positioning measurements. The positioning device may access a data structure (e.g., a home location register), utilizing the information identifying the set of network devices, to retrieve network device information (e.g., base station information) regarding the set of network devices. The network device information may include a set of network device locations, a set of network device transmission powers (e.g., transmission signal strengths), or the like, associated with the set of network devices. The network device information may have been pre-registered by the set of network devices (e.g., to avoid interference with other network devices) with the data structure.

As shown in FIG. 1B, the positioning device may determine an approximate location for the user device based on the set of positioning measurements and the retrieved network device information. For example, the positioning device may process the set of signal strength measurements and the set of network device locations to determine the approximate location for the user device (e.g., using triangulation, trilateration, multi-lateration, or the like). The positioning device may provide information associated with the approximate location for the user device to the user device. For example, the positioning device may provide location information identifying the approximate location, error information indicating an accuracy with which the approximate location was calculated, or the like to the user device for display (e.g., via a user interface). In another example, the user device may receive the network device information (e.g., base station information, such as location information or the like) for the set of network devices from the positioning device, and may process the network device information and the set of signal strength measurements to determine the approximate location for the user device (e.g., using triangulation, trilateration, multi-lateration, or the like).

In this way, pre-registered network device location information (e.g., base station location information) and signal strength information for a set of network devices may be utilized to determine a location for a user device without requesting location assistance from the set of network devices.

Figure 2:
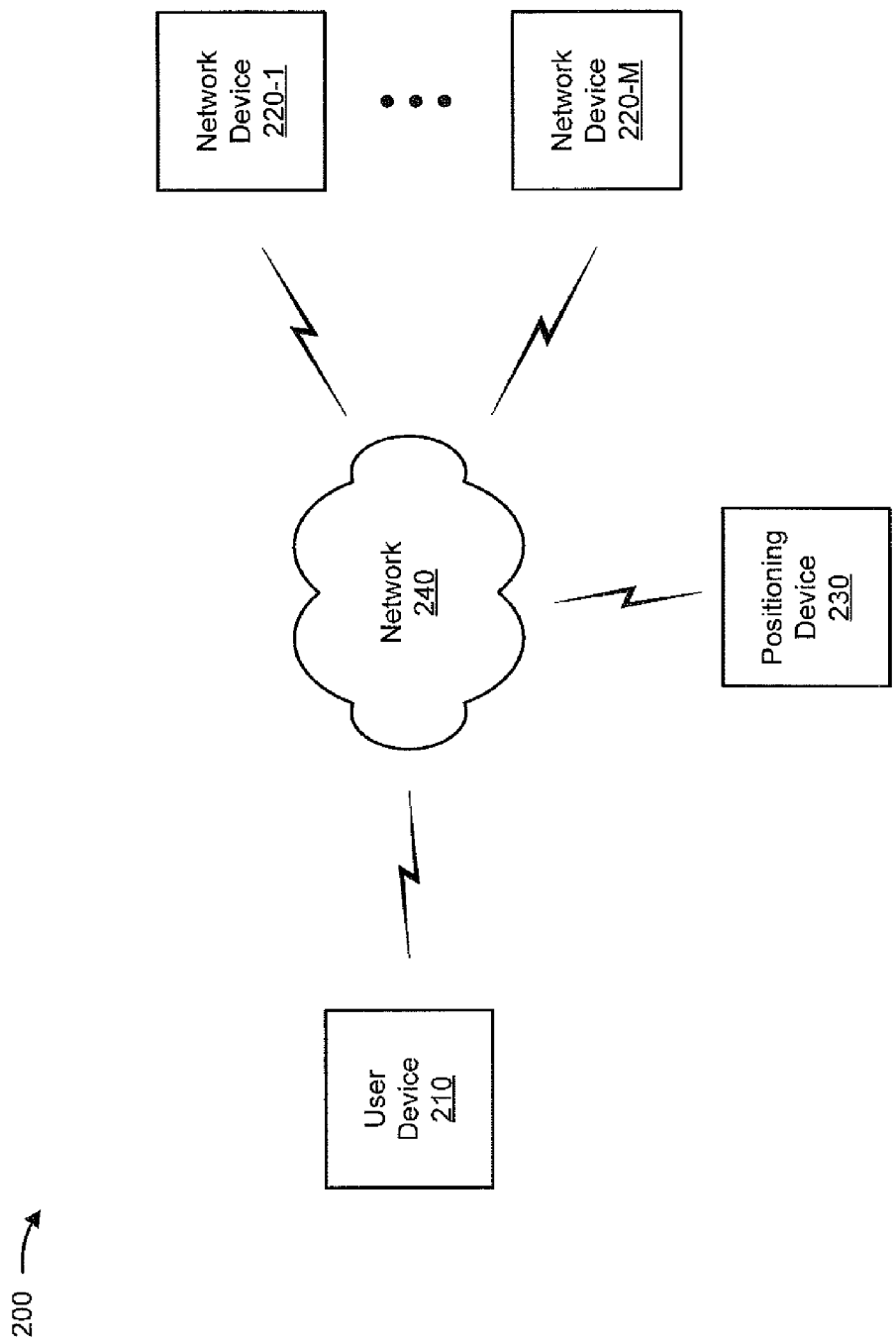
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include user device 210, network devices 220-1 to 220-M (M≥1) (hereinafter referred to collectively as "network devices 220," and individually as "network device 220"), positioning device 230, and network 240. Devices of environment 200 may interconnect via wired connections, wireless connections, or a combination of wired and wireless connections.

User device 210 may include one or more devices capable of receiving, generating, processing, storing, and/or providing information associated with a location determination. For example, user device 210 may include a mobile phone (e.g., a smart phone), a mobile station, a radiotelephone, a video phone, a personal communications systems (PCS) terminal (e.g., that may combine a cellular radiotelephone with data processing and data communications capabilities), a personal digital assistant (PDA) (e.g., that may include a radiotelephone, a pager, Internet/intranet access, etc.), a computer (e.g., a desktop computer, a laptop computer, a tablet computer, etc.), a video game console, a set-top box, or a similar type of device capable of detecting a signal from network device 220, determining an identifier associated with network device 220, and/or determining a signal strength for the signal from network device 220. In some implementations, user device 210 may provide information associated with a location determination (e.g., a signal strength measurement, a base station identifier, etc.) to positioning device 230 and/or receive information associated with the location determination from positioning device 230.

Network device 220 may include one or more devices capable of receiving, generating, processing, storing, and/or providing information associated with a location determination. For example, network device 220 may include an eNodeB, a wireless access point, a base station, such as a low power base station, a small cell base station (e.g., for an indoor small cell, a microcell, a picocell, a femtocell, etc.), etc., or the like. In some implementations, network device 220 may refer to a particular base station that includes location information, such as via pre-programming, GPS, observed time difference of arrival (OTDOA), uplink time difference of arrival (UTDA), or the like. In some implementations, network device 220 may pre-register network device information (e.g., base station information, such as location information associated with network device 220, or the like) via a home location register or another similar data structure. In some implementations, signals provided by network device 220 may include an identifier, such as a base station identity code, a cell global identity, or the like, that may be received and/or recognized by user device 210.

Positioning device 230 may include one or more devices capable of receiving, generating, processing, storing, and/or providing information associated with performing a location determination. For example, positioning device 230 may include a network server device, a mobility management entity (MME), a serving gateway (SGW), a packet data network gateway (PGW), a home subscriber server (HSS), a home location register, a router, a hub, a switch, or the like. In some implementations, positioning device 230 may identify one or more network devices 220 (e.g., based on location information, etc.) that provide signals for which signal strength measurements may be determined to support location identification for user device 210. In some implementations, positioning device 230 may provide information to user device 210, such as information associated with a location for network device 220, a signal strength for a signal associated with network device 220, or the like. In some implementations, positioning device 230 may include access to a data structure storing pre-registered information associated with network device 220, such as a home location register or the like.

Network 240 may include one or more wired and/or wireless networks. For example, network 240 may include a cellular network (e.g., a long term evolution (LTE) network, a code division multiple access (CDMA) network, etc.), a public land mobile network (PLMN), a Wi-Fi network, a local area network (LAN), a wide area network (WAN), a metropolitan area network (MAN), a telephone network (e.g., the Public Switched Telephone Network (PSTN)), a near field communication (NFC) network, a Bluetooth network, an ad hoc network, an intranet, the Internet, a fiber optic-based network, and/or a combination of these or other types of networks.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, while user device 210 and positioning device 230 are shown as separate devices, user device 210 and positioning device 230 may be implemented in a single device or in a single collection of devices. Additionally, or alternatively, a set of devices (e.g., one or more devices) of environment 200 may perform one or more functions described as being performed by another set of devices of environment 200.

Figure 3:
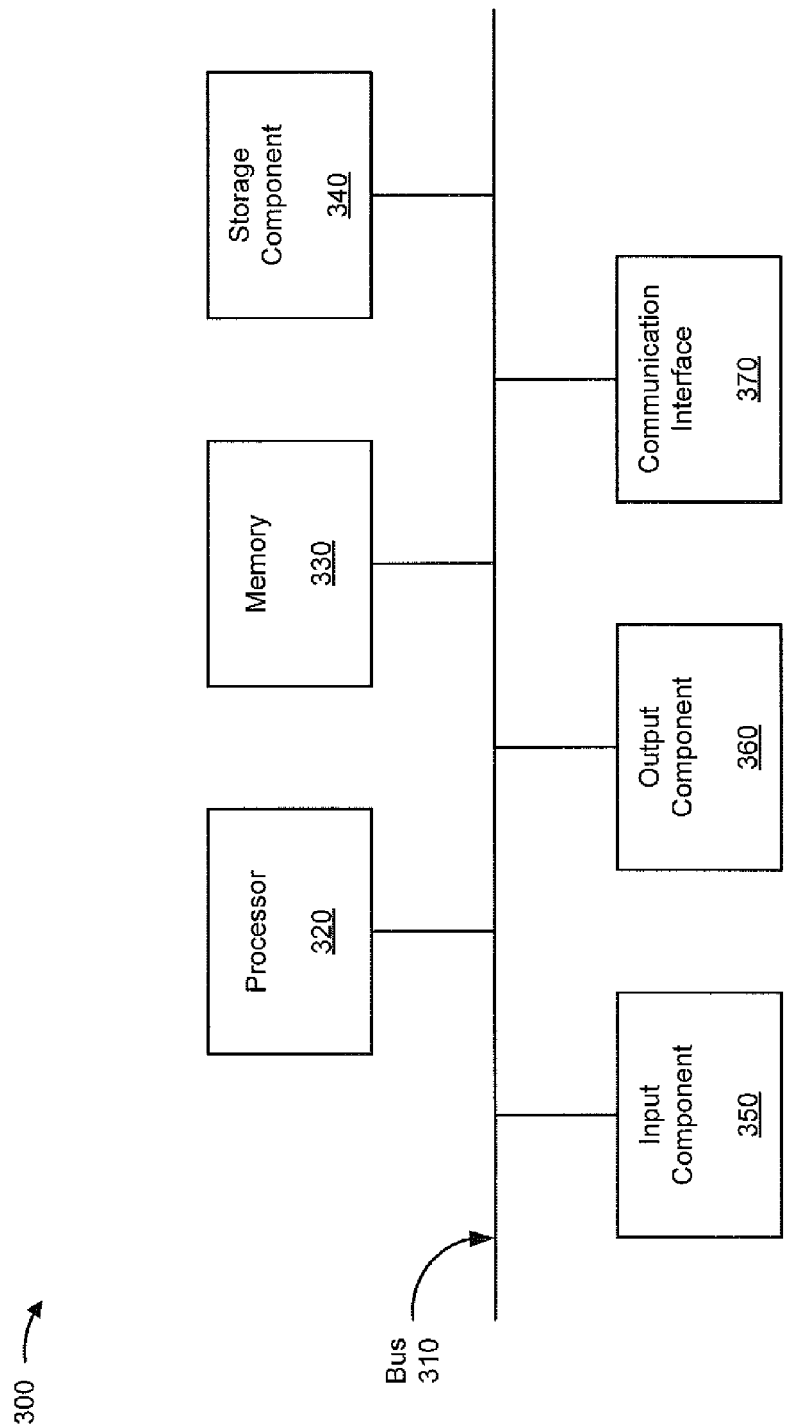
FIG. 3 is a diagram of example components of one or more devices of FIG. 2.

FIG. 3 is a diagram of example components of a device 300. Device 300 may correspond to user device 210, network device 220, and/or positioning device 230. In some implementations, user device 210, network device 220, and/or positioning device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for providing a location determination for a user device without requesting location assistance from a network device. In some implementations, one or more process blocks of FIG. 4 may be performed by positioning device 230. Additionally, or alternatively, one or more process blocks of FIG. 4 may be performed by another device or a group of devices separate from or including positioning device 230, such as user device 210 and/or network device 220.

As shown in FIG. 4, process 400 may include initiating a location determination of a location for a user device (block 410). For example, positioning device 230 may initiate the location determination of the location for user device 210. In some implementations, positioning device 230 may initiate the location determination based on receiving a request for the location determination from user device 210. For example, user device 210 may detect an adjustment to a neighbor list (e.g., identifying a previously absent network device 220), and may request the location determination based on detecting the adjustment to the neighbor list. Additionally or alternatively, user device 210 may determine that network device 220 has generated new location information associated with network device 220 (e.g., using a GPS location determination or the like) and registered the new location information with a data structure, such as a home location register or the like. In this case, user device 210 may request that positioning device 230 perform the location determination utilizing the new location information associated with network device 220 and registered via the data structure.

Additionally, or alternatively, positioning device 230 may determine to initiate the location determination based on a trigger, such as based on determining that a time threshold has been satisfied, determining that a system status change associated with user device 210 has occurred (e.g., a power reset, a general reset, a startup, etc.), determining a change in a GPS availability associated with user device 210 (e.g., determining that GPS location service is not available), detecting a user input (e.g., via a user interface associated with user device 210), or the like. In some implementations, positioning device 230 may initiate the location determination based on receiving a request for location information (e.g., from network device 220, from user device 210, from an application associated with user device 210, etc.).

As further shown in FIG. 4, process 400 may include selecting a set of network devices capable of facilitating a set of positioning measurements for the location determination (block 420). For example, positioning device 230 may select the set of network devices 220 for which user device 210 may provide the set of positioning measurements when performing the location determination. A positioning measurement may refer to information obtained based on a communication between user device 210 and network device 220, such as a signal strength measurement or the like. For example, positioning device 230 may select a particular network device 220 for which a particular signal strength measurement is to be determined when performing the location determination.

In some implementations, user device 210 may obtain the positioning measurement, to be provided to positioning device 230, based on receiving a signal from network device 220 and without providing information to network device 220. For example, user device 210 may obtain the positioning measurement without requesting location assistance from network device 220. Location assistance may refer to a process or set of processes, such as observed time difference of arrival (OTDOA), uplink-time difference of arrival (UTDA), etc. that involve network device 220 being actively instructed (e.g., by user device 210) to provide information assisting in obtaining a location for user device 210.

Positioning device 230 may select a particular network device 220 based on location information associated with the particular network device 220, in some implementations. For example, positioning device 230 may select the particular network device 220 based on determining that an accuracy with which a particular location was determined for the particular network device 220 satisfies an accuracy threshold. In some implementations, positioning device 230 may select a particular network device 220 that utilizes a different operator network from user device 210. For example, when positioning device 230 is permitted access to a home location register (e.g., that stores location information for network devices 220) associated with another operator network, positioning device 230 may permit user device 210 to select the particular network devices 220 associated with the other operator network.

Positioning device 230 may select the set of network devices 220 based on receiving information, from user device 210, indicating that user device 210 has detected signals from the set of network devices 220, in some implementations. For example, user device 210 may determine that a received signal strength for the set of network devices 220 satisfies a threshold, and may provide a set of identifiers for the set of network devices 220 (e.g., a cell global identity identifier, a base station identity code identifier, a device identifier, a network address identifier, etc.) to positioning device 230. In this case, user device 210 may determine the set of identifiers from a set of signals being provided by the set of network devices 220 (e.g., the set of signals may include information identifying the set of network devices 220). Additionally, or alternatively, user device 210 may identify a particular set of network devices 220, and may select a subset of the particular set of network devices 220 based on measured signal strength for a set of signals detected from the particular set of network devices 220.

As further shown in FIG. 4, process 400 may include determining a set of locations for the set of network devices (block 430). For example, positioning device 230 may determine the set of locations for the set of network devices 220 (e.g., a home location register or the like). In some implementations, positioning device 230 may access stored information associated with identifying the set of locations. For example, positioning device 230 may include one or more data structures storing pre-registered location information for network devices 220. In this case, the set of network devices 220 may have provided network device information (e.g., base station information, such as location information, transmission power information, identification information, or the like) for storage when accessing network 240, and positioning device 230 may have pre-registered the network device information with the one or more data structures.

Positioning device 230 may determine the set of locations for the set of network devices 220 based on requesting location information from the set of network devices 220, in some implementations. For example, positioning device 230 may request that a particular network device 220 generate new location information and register the new location information with a particular data structure (e.g., a home location register or the like). In this case, the particular network device 220 may generate the new location information (e.g., utilizing a GPS unit or the like), and positioning device 230 may receive the new location information by accessing the particular data structure.

As further shown in FIG. 4, process 400 may include determining the set of positioning measurements for the set of network devices (block 440). For example, positioning device 230 may determine the set of positioning measurements for the set of network devices 220. In some implementations, positioning device 230 may determine the set of positioning measurements based on receiving information from user device 210. For example, user device 210 may determine a signal strength for signals from a particular network device 220, and may provide an indication of the signal strength to positioning device 230. In some implementations, user device 210 may determine the signal strength for the particular network device 220 without requesting location assistance from the particular network device 220. For example, user device 210 may detect a signal from the particular network device 220, and may determine the signal strength for the signal without the signal being requested from the particular network device 220, without information being provided to the particular network device 220, or the like.

As further shown in FIG. 4, process 400 may include determining the location for the user device based on the set of locations for the set of network devices and the set of positioning measurements for the set of network devices (block 450). For example, positioning device 230 may determine the location for user device 210 based on the set of locations for the set of network devices 220 and based on the set of positioning measurements for the set of network devices 220.

In some implementations, positioning device 230 may determine the location for user device 210 based on determining a distance to a particular network device 220. For example:

$$(n_x, n_y) = (c_x^{(1)}, c_y^{(1)})$$

$$\text{Error} = d_l$$

where $n_x$ represents a calculated longitudinal location for user device 210, $n_y$ represents a calculated latitudinal location for user device 210, $c_x^{(1)}$ represents a longitudinal location for network device 220 (e.g., determined based on GPS information), $c_y^{(1)}$ represents a latitudinal location for network device 220 (e.g., determined based on GPS information), and $d_l$ represents a distance between user device 210 and network device 220 (e.g., determined based on a signal strength measurement). When positioning device 230 performs a location determination utilizing a positioning measurement associated with a signal from the particular network device 220, the error for the location determination may represent the distance between user device 210 and the particular network device 220.

In some implementations, positioning device 230 may determine a transmission power for each network device 220 (e.g., by accessing a data structure) when determining the distance between user device 210 and network device 220. Additionally, or alternatively, positioning device 230 may utilize a pre-programmed transmission power. Transmission power may refer to the power (e.g., a quantity measured with respect to a particular unit system, such as Decibel-milliwatts (dBm), arbitrary strength units (ASU), or the like) with which a signal is transmitted by network device 220.

Positioning device 230 may determine the distance between user device 210 and network device 220 based on calculating the attenuation of a signal detected by user device 210 from network device 220 (e.g., based on a particular signal strength measurement and a particular transmission power). For example:

$$L = P_0 - P_r$$

$$L = 20 \log f + N \log d + P_f(n) - 28$$

where L represents the total path loss for a signal between user device 210 and network device 220 (e.g., signal attenuation for the signal), $P_0$ represents a transmission power for the signal at initial transmission by network device 220 (e.g., transmission signal strength), $P_r$ represents another transmission power for the signal at reception by user device 210 (e.g., measured signal strength), f represents the frequency of the signal, N represents the distance power loss coefficient, d represents the distance to be determined between user device 210 and the particular network device 220 (e.g., "$d_l$"), $P_f(n)$ represents a floor loss penetration factor, and n represents a quantity of floors (e.g., levels of a building in which user device 210 and/or network device 220 may be located) between user device 210 and network device 220 (e.g., a particular environmental factor associated with signal propagation of the signal provided by network device 220 and received by user device 210).

In some implementations, positioning device 230 may determine the location for user device 210 based on utilizing mulilateration of signal strength measurements for multiple network devices 220. For example, positioning device 230 may calculate the following expressions:

$$(n_x - c_x^{(1)})^2 + (n_y - c_y^{(1)}) - d_1^2 = \Delta d_1^2$$
$$(n_x - c_x^{(2)})^2 + (n_y - c_y^{(2)}) - d_2^2 = \Delta d_2^2$$
$$(n_x - c_x^{(3)})^2 + (n_y - c_y^{(3)}) - d_3^2 = \Delta d_3^2$$
$$\vdots$$
$$(n_x - c_x^{(N)})^2 + (n_y - c_y^{(N)}) - d_N^2 = \Delta d_N^2$$

In the above set of expressions, $n_x$ represents a longitudinal location for user device 210, $c_x^{(N)}$ represents a longitudinal location for network device 220-N of a set of network devices 220, $n_y$ represents a latitudinal location for user device 210, $c_y^{(N)}$ represents a latitudinal location for network device 220-N, $d_N$ represents the determined distance between user device 210 and network device 220-N, and $\Delta d_N$ represents a residual relating to one or more measurement errors with respect to a particular signal provided by network device 220-N.

In some implementations, positioning device 230 may apply a weighting factor to one or more positioning measurements of the set of positioning measurements, when determining the location. For example, positioning device 230 may apply a first weighting factor to a first positioning measurement associated with a first network device 220, and may apply a second weighting factor to a second positioning measurement associated with a second network device 220. In some implementations, positioning device 230 may apply the weighting factor based on accuracy information. For example, positioning device 230 may determine that a particular measured signal strength, a particular transmission power, or the like, correlates to a particular accuracy with which distance determination (e.g., between user device 210 and a particular network device 220) may be performed, and may apply a particular weighting factor based on the particular accuracy.

Positioning device 230 may utilize an algorithm, such as a Levenberg-Marguardt algorithm or another algorithm, to solve the above set of expressions and determine the location $(n_x, n_y)$ for user device 210. For example, positioning device 230 may calculate:

$$(n_x, n_y) = \arg\min_{(n_x, n_y)} \sum_{j=1}^{N} (\omega_1 \Delta d_1^2 + \omega_2 \Delta d_2^2 + \cdots + \omega_N \Delta d_N^2).$$

In the above expression, $\omega_N$ represents a weighting factor applied to distance $d_N$. Similarly, positioning device 230 may calculate an error with which the location for user device 210 has been determined. For example:

$$\text{Error} = \sum_{j=1}^{N} (\omega_1 \Delta d_1^2 + \omega_2 \Delta d_2^2 + \cdots + \omega_N \Delta d_N^2)$$

In the above expression, "Error" may represent the error with which the location for user device 210 has been determined based on residual measurement errors for each positioning measurement.

As further shown in FIG. 4, process 400 may include providing information associated with the location for the user device based on determining the location for the user device (block 460). For example, positioning device 230 may provide information associated with the location for user device 210 to user device 210. In some implementations, positioning device 230 may provide information identifying the location for user device 210, identifying an accuracy with which the location for user device 210 was determined (e.g., an error quantity), or the like. For example, positioning device 230 may provide information identifying the location and the accuracy for the location to user device 210, and user device 210 may provide the information to a user via a display. Additionally, or alternatively, positioning device 230 may provide location information associated with user device 210 to network device 220, a storage device, a home subscriber server, a mobility management entity, or the like.

In this way, a location may be determined for a user device lacking access to GPS-based location information by utilizing network device location information and a set of signal strength measurements without requesting location assistance from a network device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5D are diagrams of an example implementation 500 relating to example process 400 shown in FIG. 4. FIGS. 5A-5D show an example of performing a location determination for a user device without requesting location assistance from a network device.

Figure 5A:
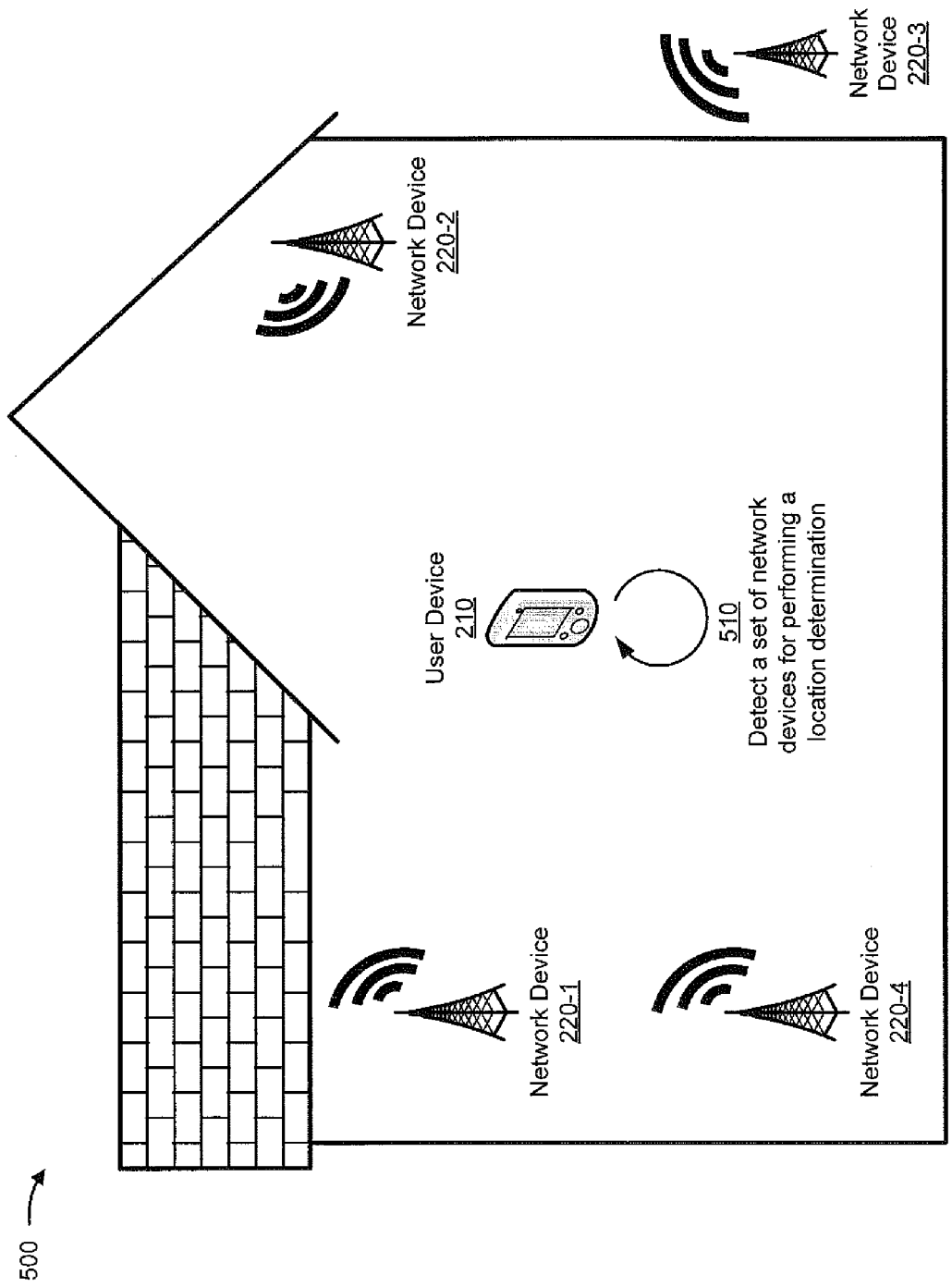

As shown in FIG. 5A, example implementation 500 includes user device 210 and a set of network devices 220, such as network device 220-1, network device 220-2, network device 220-3, and network device 220-4. Assume that positioning device 230 (not shown) has initiated a location determination for user device 210, and has requested information identifying the set of network devices 220 that are to be utilized for the location determination. As shown by reference number 510, user device 210 detects the set of network devices 220 (e.g., based on receiving a set of signals from the set of network devices 220). Assume that user device 210 selects network device 220-1, network device 220-3, and network device 220-4 to be utilized for the location determination.

As shown in FIG. 5B, and by reference number 520, user device 210 determines a set of signal strength positioning measurements for the set of signals received from the set of selected network devices 220. For example, user device 210 determines a first signal strength for a first signal associated with network device 220-1 (e.g., "65 ASU"), user device 210 determines a second signal strength for a second signal associated with network device 220-3 (e.g., "80 ASU"), and user device 210 determines a third signal strength for a third signal associated with network device 220-4 (e.g., "75 ASU"). Assume that user device 210 determines, from receiving the set of signals from the set of selected network devices 220, a first identifier for network device 220-1 (e.g., "WWW"), a second identifier for network device 220-3 (e.g., "YYY"), and a third identifier for network device 220-4 (e.g., "ZZZ").

Figure 5C:
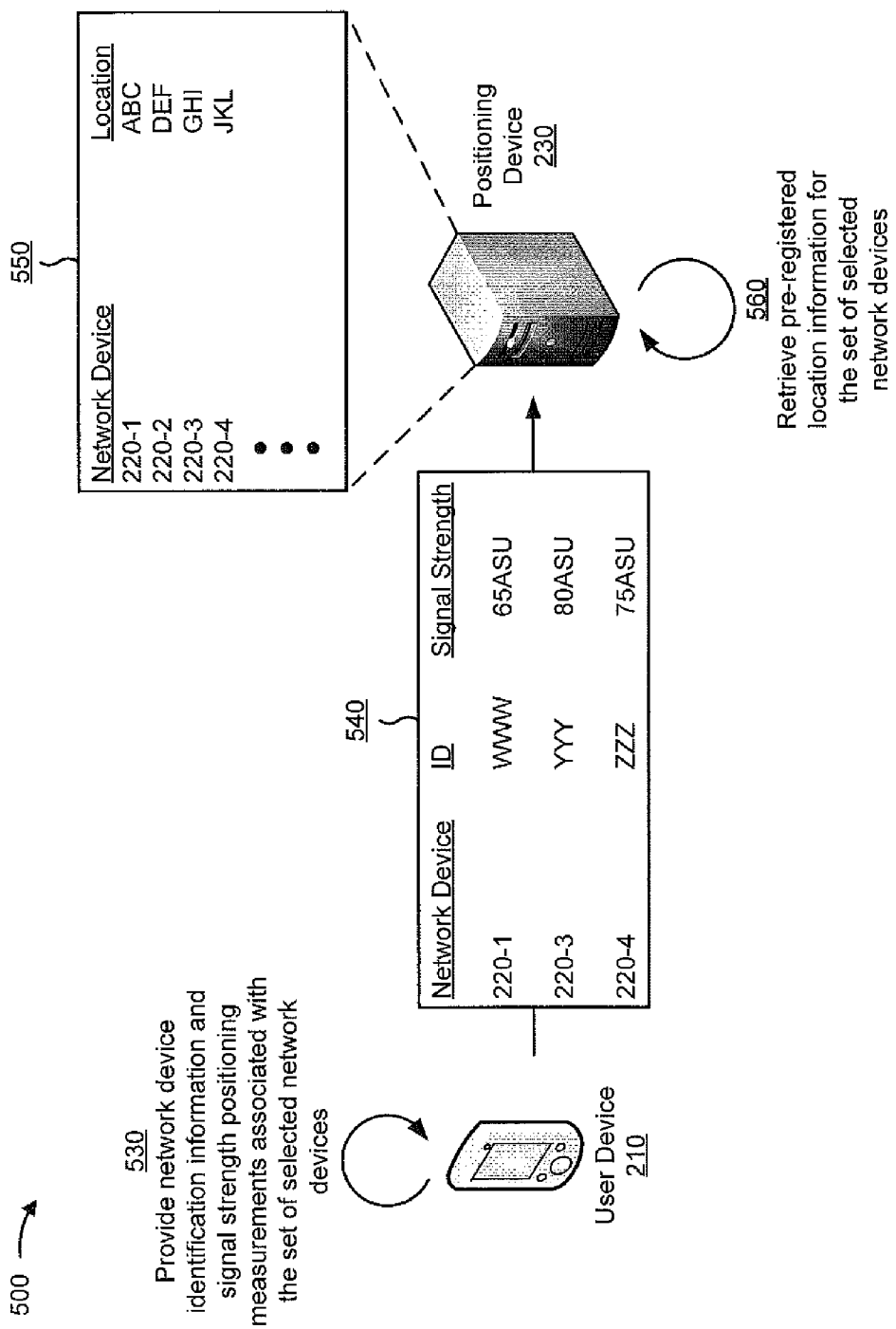

As shown in FIG. 5C, and by reference number 530, user device 210 provides information identifying the set of selected network devices 220 (e.g., the first identifier, the second identifier, and the third identifier) and information identifying the signal strength positioning measurements associated with the set of selected network devices 220. As shown by reference number 540, positioning device 230 receives a message from user device 210 that includes a set of identifiers and a set of measured signal strengths associated with the set of selected network devices 220. As shown by reference number 550, positioning device 230 includes a data structure storing location information for the set of network devices 220. As shown by reference number 560, based on receiving the information identifying the set of selected network devices 220 with which the location determination is to be performed, positioning device 230 obtains location information for the set of selected network devices 220 from the data structure storing location information.

Figure 5D:
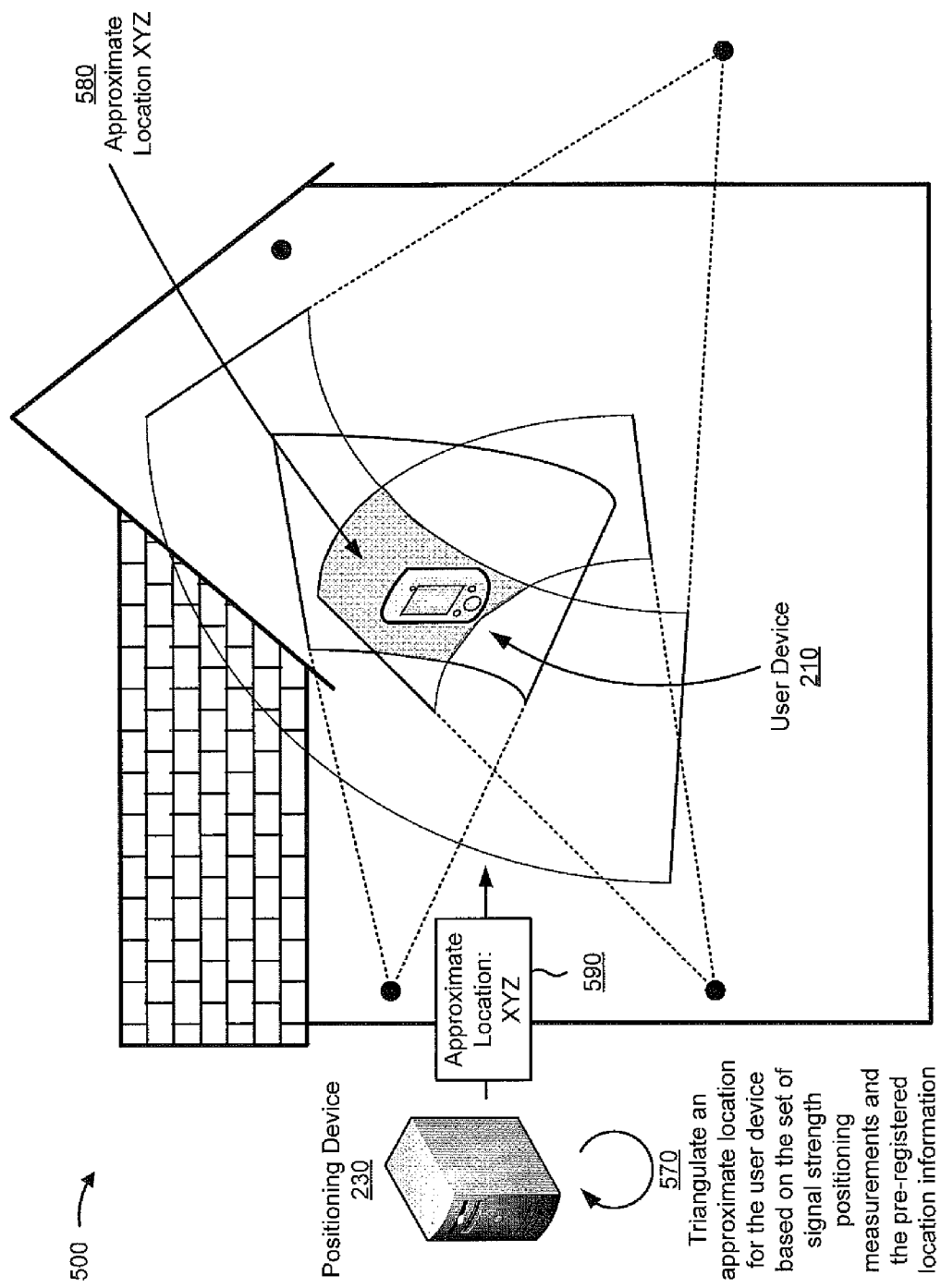

As shown in FIG. 5D, and by reference number 570, positioning device 230 triangulates an approximate location for user device 210 based on the set of signal strength positioning measurements for the set of signals from the set of selected network devices 220 and the location information for the set of selected network devices 220. As shown by reference number 580, the approximate location (e.g., "XYZ") is determined and, as shown by reference number 590, positioning device 230 provides location information identifying the approximate location to user device 210.

As indicated above, FIGS. 5A-5D are provided merely as an example. Other examples are possible and may differ from what was described with regard to FIGS. 5A-5D.

Implementations described herein may assist a user device in determining a location based on location information associated with one or more network devices and a set of signal strength measurements associated with the one or more network devices without requesting location assistance from the one or more network devices.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A non-transitory computer-readable medium storing instructions, the instructions comprising:
one or more instructions that, when executed by one or more processors, cause the one or more processors to:
receive, from a user device, a request for location determination for the user device based on a change to a base station;
initiate the location determination for the user device based on receiving the request;
receive, from the user device and based on initiating the location determination, an indication of a signal strength associated with a signal transmitted by the base station,
the indication of the signal strength being received without a request for location assistance from the base station;

identify a floor loss penetration factor that is based on a quantity of floors between the user device and the base station,
the floor loss penetration factor including an environmental factor associated with signal propagation of the signal transmitted by the base station,
calculate a transmission loss for the signal transmitted by the base station based on:
the indication of the signal strength,
the floor loss penetration factor including the environmental factor associated with the signal propagation of the signal transmitted by the base station, and
information identifying a transmission power for the base station;
request location information regarding a location of the base station from the base station;
obtain the location information based on requesting the location information;
determine an approximate location for the user device based on:
the transmission loss, and
the location information; and
provide information associated with the approximate location for the user device.

2. The non-transitory computer-readable medium of claim 1, where the one or more instructions, when executed by the one or more processors, further cause the one or more processors to:
receive information associated with a base station identifier from the user device; and
where the one or more instructions, that cause the one or more processors to receive the indication of the signal strength, cause the one or more processors to:
receive the indication of the signal strength based on receiving the information associated with the base station identifier from the user device.

3. The non-transitory computer-readable medium of claim 1, where the one or more instructions, when executed by the one or more processors, further cause the one or more processors to:
determine that the signal strength satisfies a signal strength threshold; and
determine a particular factor based on determining that the signal strength satisfies the signal strength threshold; and
where the one or more instructions, that cause the one or more processors to determine the approximate location for the user device, cause the one or more processors to:
determine the approximate location for the user device further based on the particular factor.

4. The non-transitory computer-readable medium of claim 1, where the one or more instructions, when executed by the one or more processors, further cause the one or more processors to:
determine a signal frequency associated with the signal transmitted by the base station; and
determine a particular factor based on the signal frequency associated with the signal transmitted by the base station; and
where the one or more instructions, that cause the one or more processors to determine the approximate location for the user device, cause the one or more processors to:
determine the approximate location for the user device further based on the particular factor.

5. The non-transitory computer-readable medium of claim 1, where the one or more instructions, when executed by the one or more processors, further cause the one or more processors to:
determine a set of other approximate locations for the user device based on a set of other transmission losses associated with a set of other signals transmitted by a set of other base stations and based on a set of other locations for the set of other base stations; and
utilize multi-lateration to determine a particular approximate location for the user device based on the approximate location and the set of other approximate locations; and
where the one or more instructions, that cause the one or more processors to provide the information associated with the approximate location for the user device, cause the one or more processors to:
provide information associated with the particular approximate location for the user device based on determining the particular approximate location for the user device.

6. The non-transitory computer-readable medium of claim 1, where the one or more instructions, that cause the one or more processors to determine the approximate location for the user device, cause the one or more processors to:
determine an error value associated with the approximate location for the user device,
the error value representing an accuracy associated with the approximate location for the user device; and
where the one or more instructions, that cause the one or more processors to provide the information associated with the approximate location for the user device, cause the one or more processors to:
provide information identifying the error value associated with the approximate location for the user device.

7. The non-transitory computer-readable medium of claim 1, where the one or more instructions, when executed by the one or more processors, further cause the one or more processors to:
determine that a global positioning system (GPS) unit associated with the user device is unable to provide location information;
where the one or more instructions, that cause the one or more processors to initiate the location determination for the user device, further cause the one or more processors to:
initiate the location determination for the user device based on determining that the GPS unit associated with the user device is unable to provide location information; and
where the one or more instructions, when executed by the one or more processors, further cause the one or more processors to:
receive information associated with the signal transmitted by the base station based on initiating the location determination for the user device.

8. A method, comprising:
receiving, by one or more processors, a request for location determination for a user device based on a change to a base station;
initiating, by the one or more processors, the location determination for the user device based on receiving the request;

receiving, by the one or more processors, an indication of a signal strength associated with a signal transmitted by the base station,
  the indication of the signal strength being received without a request for location assistance from the base station;
identifying, by the one or more processors, a floor loss penetration factor that is based on a quantity of floors between the user device and the base station,
  the floor loss penetration factor including an environmental factor associated with signal propagation of the signal transmitted by the base station;
calculating, by the one or more processors, a transmission loss for the signal transmitted by the base station based on:
  the indication of the signal strength,
  the environmental factor associated with the signal propagation of the signal transmitted by the base station, and
  information identifying a transmission power for the base station;
requesting, by the one or more processors, location information regarding a location of the base station from the base station;
obtaining, by the one or more processors, the location information based on requesting the location information;
determining, by the one or more processors, an approximate location for the user device based on:
  the transmission loss, and
  the location information; and
providing, by the one or more processors, information associated with the approximate location for the user device.

9. The method of claim 8, further comprising:
receiving information associated with a base station identifier from the user device; and
where receiving the indication of the signal strength includes:
  receiving the signal strength based on receiving the information associated with the base station identifier from the user device.

10. The method of claim 8, further comprising:
determining that the signal strength satisfies a signal strength threshold; and
determining a particular factor based on determining that the signal strength satisfies the signal strength threshold; and
where determining the approximate location for the user device includes:
  determining the approximate location for the user device further based on the particular factor.

11. The method of claim 8, further comprising:
determining a signal frequency associated with the signal transmitted by the base station; and
determining a particular factor based on the signal frequency associated with the signal transmitted by the base station; and
where determining the approximate location for the user device includes:
  determining the approximate location for the user device based on the particular factor.

12. The method of claim 8, further comprising:
determining a set of other approximate locations for the user device based on a set of other transmission losses associated with a set of other signals transmitted by a set of other base stations and based on a set of other locations for the set of other base stations; and
utilizing multi-lateration to determine a particular approximate location for the user device based on the approximate location and the set of other approximate locations; and
where providing the information associated with the approximate location for the user device includes:
  providing information associated with the particular approximate location for the user device based on determining the particular approximate location.

13. The method of claim 8, where determining the approximate location for the user device includes:
determining an error value associated with the approximate location for the user device,
  the error value representing an accuracy associated with the approximate location for the user device; and
where providing the information associated with the approximate location for the user device includes:
  providing information identifying the error value associated with the approximate location for the user device.

14. The method of claim 8, further comprising:
determining that a global positioning system (GPS) unit associated with the user device is unable to provide location information;
where initiating the location determination for the user device comprises:
  initiating the location determination for the user device based on determining that the GPS unit associated with the user device is unable to provide location information; and
where the method further comprises:
  receiving information associated with the signal transmitted by the base station based on initiating the location determination for the user device.

15. A device comprising:
one or more processors to:
  receive a request for location determination for a user device based on a change to a base station;
  initiate the location determination for the user device based on receiving the request;
  receive, based on initiating the location determination, an indication of a signal strength associated with a signal transmitted by the base station,
    the indication of the signal strength being received without a request for location assistance from the base station;
  identify a floor loss penetration factor that is based on a quantity of floors between the user device and the base station,
    the floor loss penetration factor including an environmental factor associated with signal propagation of the signal transmitted by the base station;
  calculate a transmission loss for the signal transmitted by the base station based on:
    the indication of the signal strength,
    the floor loss penetration factor, and
    information identifying a transmission power for the base station;
  request location information regarding a location of the base station from the base station;
  obtain the location information based on requesting the location information;

determine an approximate location for the user device based on:
the transmission loss, and
the location information; and
provide information associated with the approximate location for the user device.

16. The device of claim 15, where the one or more processors are further to:
receive information associated with a base station identifier from the user device; and
where, when receiving the indication of the signal strength, the one or more processors are to:
receive the indication of the signal strength based on receiving the information associated with the base station identifier from the user device.

17. The device of claim 15, where the one or more processors are further to:
determine that the signal strength of the signal transmitted by the base station satisfies a signal strength threshold; and
determine a particular factor based on determining that the signal strength of the signal transmitted by the base station satisfies the signal strength threshold; and
where, when determining the approximate location for the user device, the one or more processors are to:
determine the approximate location for the user device further based on the particular factor.

18. The device of claim 15, where the one or more processors are further to:
determine a signal frequency associated with the signal transmitted by the base station; and
determine a particular factor based on the signal frequency associated with the signal transmitted by the base station; and
where, when determining the approximate location for the user device, the one or more processors are to:
determine the approximate location for the user device further based on the particular factor.

19. The device of claim 15, where the one or more processors are further to:
determine a set of other approximate locations for the user device based on a set of other transmission losses associated with a set of other signals transmitted by a set of other base stations and based on a set of other locations for the set of other base stations; and
utilize multi-lateration to determine a particular approximate location for the user device based on the approximate location and the set of other approximate locations; and
where, when providing the information associated with the approximate location for the user device, the one or more processors are to:
provide information associated with the particular approximate location for the user device based on determining the particular approximate location.

20. The device of claim 15, where, when determining the approximate location for the user device, the one or more processors are to:
determine an error value associated with the approximate location for the user device,
the error value representing an accuracy associated with the approximate location for the user device; and
where, when providing the information associated with the approximate location for the user device, the one or more processors are to:
provide information identifying the error value associated with the approximate location for the user device.

* * * * *